United States Patent
Lin et al.

(10) Patent No.: US 8,952,087 B2
(45) Date of Patent: Feb. 10, 2015

(54) METHOD FOR REDUCING METAL ION WITH NANOSILICATE PLATELETS AND DISPERSING METAL NANOPARTICLE AND PRODUCT THEREOF

(75) Inventors: Jiang-Jen Lin, Taipei (TW); Yi-Lin Liao, Taipei (TW); Chien-Chia Chu, Taipei (TW); Chih-Wei Chiu, Taipei (TW)

(73) Assignee: National Taiwan University, Taipei (TW)

( * ) Notice: Subject to any disclaimer, the term of this patent is extended or adjusted under 35 U.S.C. 154(b) by 1215 days.

(21) Appl. No.: 12/258,402

(22) Filed: Oct. 25, 2008

(65) Prior Publication Data

US 2009/0149592 A1 Jun. 11, 2009

(30) Foreign Application Priority Data

Dec. 7, 2007 (TW) ................................ 96146926 A

(51) Int. Cl.
| | |
|---|---|
| *C08K 3/08* | (2006.01) |
| *B22F 9/00* | (2006.01) |
| *B22F 1/00* | (2006.01) |
| *B22F 9/24* | (2006.01) |
| *B82Y 30/00* | (2011.01) |

(52) U.S. Cl.
CPC ................ *B22F 9/24* (2013.01); *B22F 1/0022* (2013.01); *B82Y 30/00* (2013.01); *B22F 2999/00* (2013.01)

USPC ................................ 524/440; 75/362; 75/371

(58) Field of Classification Search
USPC ...................... 524/440; 75/362, 371
See application file for complete search history.

(56) References Cited

U.S. PATENT DOCUMENTS 7,022,299 B2 * 4/2006 Lin et al. ................. 423/335

OTHER PUBLICATIONS

Huang et al., Preparation and characterization of metal-chitosan nanocomposites, Colloids and Surface B: Biointerfaces 39 (2004) 31-37.*
Gao et al., Deposition of silver nanoparticles on montmorillonite platelets by chemical plating, Journal of materials Science 37 (2002) 5083-5087.*
Doering et al., Single-Molecule and single-nanoparticle SERS: Examining the roles of surface active sitres and chemical enhancement, J. Phys. Chem.B 2002,106,311-317.*

* cited by examiner

*Primary Examiner* — Shuangyi Abu Ali
(74) *Attorney, Agent, or Firm* — Pai Patent & Trademark Law Firm; Chao-Chang David Pai

(57) ABSTRACT

The present invention provides a method for reducing metal ions (for example, silver ions) and stably dispersing metal nanoparticles by nanosilicate platelets. An organic dispersant, nanosilicate platelets and a metal ionic solution are mixed to perform a reductive reaction, wherein the organic dispersant is tri-sodium citrate dihydrate (SCD), chitosan or polyvinyl pyrrolidone (PVP), to produce a mixture of stably dispersed metal nanoparticles.

9 Claims, 12 Drawing Sheets

US 8,952,087 B2

METHOD FOR REDUCING METAL ION WITH NANOSILICATE PLATELETS AND DISPERSING METAL NANOPARTICLE AND PRODUCT THEREOF

BACKGROUND OF THE INVENTION

1. Field of the Invention

The present invention relates to a method for reducing metal ions with nanosilicate platelets (NSP), particularly for producing an aqueous solution of stably dispersed reduced metal nanoparticles. This method and the metal nanoparticles are suitable as nano-composite materials and biomedical materials, for example, electrical devices, catalysts, conductors, biosensor, pharmaceutical and polymers. The present invention also relates to the product obtained by the above method, namely stably dispersed metal nanoparticles including Ag nanoparticles and Cu nanoparticles.

2. Related Prior Arts

1. In recent years, the inventor(s) of the present invention have developed many processes and products for modifying clay and nanosilicate platelets (NSP), for example, those disclosed in U.S. Pat. Nos. 7,125,916, 7,094,815, and 7,022,299 or Publication Nos.: US 2006-0287413-A1 and US 2006-0063876A1. In addition, a series of polymeric surfactants used for modifying smectic clay are obtained. By adding the surfactants, the clay can be directly exfoliated through ionic exchanging reactions, then the exfoliated clay is extracted with NaOH water/toluene biphase solution to obtain pure nanosilicate platelets. The nanosilicate platelets have a high aspect ratio (on average, 100× 100×1 nm$^3$), high specific surface area (700~800 m$^2$/g) and strong charges (ca. 20,000 ions/platelet), and generally there are about 4×10$^{16}$ platelets per gram thereof. FIG. 1 shows the basic structure of the silicate platelets. With the above characteristics, surface charges of the nanosilicate platelets vary with pH, that is, negative when above the isoelectric point (IEP, pH 6.4) and positive when below the IEP. Aggregation occurs when the surface charges are positive.

Due to the high charge density of ions, the nanosilicate platelets in a water solution can strongly adsorb metal ions and thus precipitate. For example, a black precipitate will be immediately generated after adding AgNO$_3$ into a water solution of the nanosilicate platelets. Such reaction is vigorous and will result in quick aggregation.

So far, methods for producing silver nanoparticles are classified into physical methods and chemical methods. The physical method usually demands expensive equipment for highly-vacuum vaporization or e-beam. The chemical method uses reducers to reduce the silver ions as atoms and then a stabilizer is used to control the size of the particles. The general reducers include NaBH$_4$, formaldehyde, alcohol, hydrazine (H$_2$N—NH$_2$); and the stabilizers include sodium citrate, glucose, sodium dodecyl sulfate, polyvinyl pyrrolidone (PVP), dendrimer, etc.

In the present invention, the nanosilicate platelets are provided for the purpose of reducing metal ion with a proper stabilizer to obtain nanoparticles.

SUMMARY OF THE INVENTION

The major object of the present invention is to provide a method for reducing metal ions with nanosilicate platelets (NSP) to produce a solution of stably dispersed metal nanoparticles.

Another object of the present invention is to provide a method for reducing silver ions with nanosilicate platelets to produce a solution of stably dispersed Ag nanoparticles.

Specifically, the method of the present invention includes at least one step of: mixing an organic dispersant, nanosilicate platelets and a metal ionic solution to perform a reductive reaction, wherein the organic dispersant is selected from the group consisting of tri-sodium citrate dihydrate (SCD), chitosan and polyvinyl pyrrolidone (PVP). With this method a solution of stably dispersed metal nanoparticles can be obtained.

The above nanosilicate platelets are preferably exfoliated smectic silicate clay, for example, synthetic fluoric mica, K10, Na$^+$-MMT, SWN, bentonite, laponite, kaolin, LDH, talc, attapulgite clay and vermiculite. The smectic silicate clay can be in the form of layers or sheets or platelets.

The above metal ion can be Ag, Au, Cu or Fe, wherein Ag is preferred. The metal ionic solution can be a water solution of nitrate, chloride or bromide of the metal ions, wherein the water solution of AgNO$_3$, AgCl or AgBr is preferred.

Preferably, the above SCD solution is first mixed with the metal ionic solution, and then added into the NSP solution. If the NSP solution has a concentration of about 0.01~0.1 wt. %, the weight ratio of NSP/metal ion is preferably about 1/0.2~1/4, and the equivalent ratio of NSP/SCD is preferably about 1/1.1~1/21.5. If the NSP solution has a concentration of about 0.01~1.0 wt. %, the weight ratio of NSP/metal ion is preferably about 1/0.2~1/1, and the equivalent ratio of NSP/SCD is preferably about 1/1.1~1/10.

The above NSP solution also can be first mixed with the chitosan solution or the PVP solution, and then added into the metal ionic solution. Thus preferably the weight ratio of NSP/metal ion is about 1/0.1~1/9, and meanwhile the weight ratio of NSP/chitosan is about 1/0.01~1/5. Alternatively, the weight ratio of NSP/metal ion is preferably about 1/0.1~1/2, and meanwhile the weight ratio of NSP/PVP is about 1/0.01~1/5.

The above reductive reaction is preferably performed at about 60~100° C., and/or for 1~4 hours.

By means of the above method, the present invention is able to produce a solution of stably dispersed metal nanoparticles, particularly Ag nanoparticles.

DETAILED DESCRIPTION OF THE PREFERRED EMBODIMENTS

Figure 1:
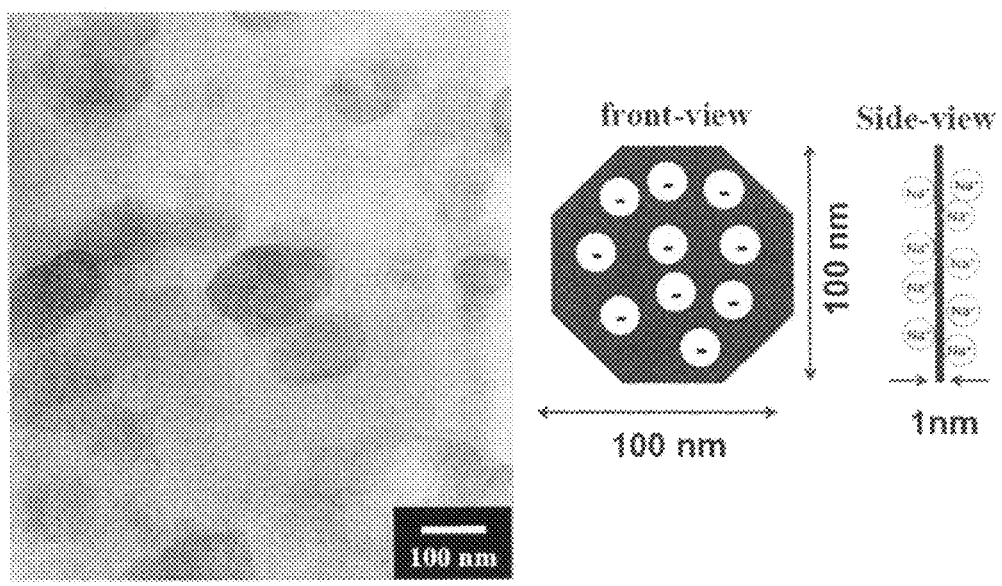
FIG. 1 shows the basic structure and features of the nanosilicate platelets.

The materials used in the preferred embodiments of the present invention include:

1. Nanosilicate platelets: prepared according to the methods disclosed in U.S. Pat. Nos. 7,125,916, 7,094,815, and 7,022,299 or Publication Nos.: US 2006-0287413-A1 and US 2006-0063876A1.
2. Sodium montmorillonite: Na$^+$-MMT, smectic aluminum silicate clay, product of Nancor Co.
3. AgNO$_3$: Mw=169.87, product of J.T. Baker, Inc.
4. Tri-sodium citrate dihydrate (SCD): product of Aldrich Chemical Co.
5. Chitosan: product of Shin Era Technology Co., LTD.
6. Polyvinyl pyrrolidone (PVP): Mw=10,000, product of Sigma.

Detailed procedures of the method, preparing Ag nanoparticles by reductive reaction with nanosilicate platelets (NSP), of the present invention are described in the following Examples, wherein Examples 1-1~1-5 use SCD as a stabilizer and the results are compared with those of Comparative Examples 1-1~1-7; Examples 2-1~2-9 use chitosan as a stabilizer and the results are compared with those of Comparative Examples 2-1~2-2; and Examples 3-1~3-8 use PVP as a stabilizer and the results are compared with those of Comparative Examples 3-1~3-2.

Example 1-1

First, the SCD solution (38.8 mM, 1.6 ml) is added into the AgNO$_3$ solution (1 mM, 20 ml) and mixed well. The mixture solution is then slowly added into the NSP solution (0.1 wt. %, 16.67 g), so that the weight ratio of NSP/AgNO$_3$ is 1/0.2. The resultant solution is heated in a water bath at about 60° C. for about 1~2 hours, and then the initially transparent solution becomes golden.

Example 1-2

Repeat the procedures of Example 1-1, but the concentrations and equivalent ratios of the reactants and reaction time are changed as listed in Table 1. The UV adsorption wavelength of the Ag nanoparticles is measured and listed in Table 1. The reaction solution becomes yellow.

Example 1-3

Repeat the procedures of Example 1-1, but the concentrations and equivalent ratios of the reactants and reaction time are changed as listed in Table 1. The UV adsorption wavelength of the Ag nanoparticles is measured and listed in Table 1. The reaction solution becomes yellow.

Example 1-4

Repeat the procedures of Example 1-1, but the concentrations and equivalent ratios of the reactants and reaction time are changed as listed in Table 1. The UV adsorption wavelength of the Ag nanoparticles is measured and listed in Table 1. The reaction solution becomes yellow-green and the upper liquid becomes yellow after a few days.

Example 1-5

Repeat the procedures of Example 1-1, but the concentrations and equivalent ratios of the reactants and reaction time are changed as listed in Table 1. The UV adsorption wavelength of the Ag nanoparticles is measured and listed in Table 1. The reaction solution becomes yellow.

Comparative Example 1-1

Repeat the procedures of Example 1-1, but the concentrations and equivalent ratios of the reactants and reaction time are changed as listed in Table 1. The UV adsorption wavelength of the Ag nanoparticles is measured and listed in Table 1. The reaction solution is still transparent.

Comparative Example 1-2

Repeat the procedures of Example 1-1, but the concentrations and equivalent ratios of the reactants and reaction time are changed as listed in Table 1. The UV adsorption wavelength of the Ag nanoparticles is measured and listed in Table 1. The reaction solution becomes yellow but the upper liquid becomes transparent.

Comparative Example 1-3

Repeat the procedures of Example 1-1, but the concentrations and equivalent ratios of the reactants and reaction time are changed as listed in Table 1. The UV adsorption wavelength of the Ag nanoparticles is measured and listed in Table 1. The gray reaction solution becomes gray-yellow, then dark green and then black. The upper liquid becomes transparent after a few hours.

Comparative Examples 1-4~1-7

Repeat the procedures of Example 1-1, but the concentrations and equivalent ratios of the reactants and reaction time are changed as listed in Table 1. The UV adsorption wavelength of the Ag nanoparticles is measured and listed in Table 1. Aggregation occurs immediately and the upper liquid becomes transparent.

TABLE 1

| Example/ Comparative Example | Initial NSP (wt. %) | Weight ratio of NSP/AgNO$_3$/SCD | Reaction time (hr.) | Color of the solution after reaction | UV adsorption wavelength (nm) |
|---|---|---|---|---|---|
| Example 1-1 | 0.1 | 1/0.2/1.1 | 1~2 | Golden | 416 |
| Example 1-2 | | 1/2/10.7 | 2~3 | Yellow | 430 |
| Example 1-3 | | 1/4/21.5 | 2~3 | Yellow | 427 |
| Comparative Example 1-1 | | 1/10/53.7 | 2~3 | Transparent | — |
| Example 1-4 | 0.5 | 1/0.2/1.1 | 1~2 | Yellow | 415 |
| Comparative Example 1-2 | | 1/2/10.7 | 1~2 | Transparent aggregation | — |

TABLE 1-continued

| Example/ Comparative Example | Initial NSP (wt. %) | Weight ratio of NSP/AgNO$_3$/SCD | Reaction time (hr.) | Color of the solution after reaction | UV adsorption wavelength (nm) |
|---|---|---|---|---|---|
| Comparative Example 1-3 | | 1/4/21.5 | 2~3 | Transparent aggregation | — |
| Comparative Example 1-4 | | 1/10/53.7 | 2~3 | Transparent aggregation | — |
| Example 1-5 | 1.0 | 1/1/1.1 | 2~3 | Yellow | 406 |
| Comparative Example 1-5 | | 1/10/10.7 | 2~3 | Transparent aggregation | — |
| Comparative Example 1-6 | | 1/20/21.5 | 2~3 | Transparent aggregation | — |
| Comparative Example 1-7 | | 1/50/53.7 | 2~3 | Transparent aggregation | — |
| Comparative Example 1-8 | 0 | — | 2~3 | Transparent | — |
| Comparative Example 1-9 | MMT | — | 2~3 | Earth | — |
| Comparative Example 1-10 | MMT | No SCD | 2~3 | Earth | — |
| Comparative Example 1-11 | 0.5 | No SCD | 2~3 | Transparent aggregation | — |

Example 2-1

First, the NSP solution (5 wt. %, 2 g) is added into the chitosan solution (5 wt. %, 0.02 g), and then water (28 g) is added therein and mixed well. The mixture solution is slowly added into the AgNO$_3$ solution (0.1 wt. %, 10 g), so that the weight ratio of NSP/AgNO$_3$/chitosan is 1/0.1/0.01. The solution changes from an initially creamy color to a brown color after it is heated in a water bath at 80~90° C.

Examples 2-2~2-9

Repeat the procedures of Example 2-1, but the concentrations and equivalent ratios of the reactants and reaction time are changed as listed in Table 2. The colors of the solution after reaction and the UV adsorption wavelength of the Ag nanoparticles are measured and listed in Table 2.

Comparative Examples 2-1~2-2

Repeat the procedures of Example 2-1, but the concentrations and equivalent ratios of the reactants and reaction time are changed as listed in Table 2. The colors of the solutions after reaction and the UV adsorption wavelengths of the Ag nanoparticles are measured and listed in Table 2. The transparent reaction solution in Comparative Example 2-1 is still in creamy color, whereas the solution in Comparative Example 2-2 becomes red-brown.

TABLE 2

| Example/ Comparative Example | Final NSP (wt. %) | weight ratio of NSP/AgNO$_3$/Chitosan | Color of the solution after reaction | UV adsorption wavelength (nm) |
|---|---|---|---|---|
| Example 2-1 | 0.2 | 1/0.1/0.01 | Yellow-brown | 420 |
| Example 2-2 | | 1/0.1/1.0 | Yellow | 410 |
| Comparative Example 2-1 | | 1/0.2/5 | Creamy | — |
| Example 2-3 | | 1/0.4/5 | Yellow | 415 |
| Comparative Example 2-2 | | 1/0.5/0.05 | Red-brown | — |
| Example 2-4 | | 1/1/1 | Yellow-brown | 420 |
| Example 2-5 | | 1/1/5 | Yellow | 415 |
| Example 2-6 | | 1/2/1 | Dark yellow-brown | 430 |
| Example 2-7 | | 1/2/5 | Dark Yellow | 415 |
| Example 2-8 | | 1/4/5 | Dark brown | 460 |
| Example 2-9 | | 1/9/5 | Dark gray-green | 475 |

Example 3-1

First, the NSP solution (5 wt. %, 20 g) is added into the PVP solution (0.1 g), and then water (10 g) is added therein and mixed well. The mixture solution is slowly added into the AgNO$_3$ solution (1 wt. %, 10 g), so that the weight ratio of NSP/AgNO$_3$/PVP is 1/0.1/0.1. After it is heated in a water bath at about 80~90° C. for 2~3 hours, the reactant solution becomes yellow-brown.

Examples 3-2~3-8

Repeat the procedures of Example 3-1, but the concentrations and equivalent ratios of the reactants and reaction time are changed as listed in Table 3. The colors of the solutions after reaction and the UV adsorption wavelengths of the Ag nanoparticles are measured and listed in Table 3.

Comparative Examples 3-1~3-2

Repeat the procedures of Example 3-1, but the concentrations and equivalent ratios of the reactants and reaction time are changed as listed in Table 3. The colors of the solutions after reaction and the UV adsorption wavelengths of the Ag nanoparticles are measured and listed in Table 3.

TABLE 3

| Example/ Comparative Example | Final NSP (wt. %) | Weight ratio of NSP/AgNO$_3$/PVP | Color of the solution after reaction | UV wavelength (nm) |
|---|---|---|---|---|
| Comparative Example 3-1 | 0.2 | 1/0.1/0.01 | Brown | — |
| Comparative Example 3-2 | | 1/0.02/0.1 | Yellow-brown | — |
| Example 3-1 | | 1/0.1/0.1 | Yellow-brown | 415 |
| Example 3-2 | | 1/0.2/0.1 | Dark yellow-brown | 450 |
| Example 3-3 | | 1/0.3/0.1 | Dark yellow-brown | 470 |
| Example 3-4 | | 1/0.2/0.2 | Dark yellow-brown | 440 |
| Example 3-5 | | 1/0.2/1 | Dark yellow-brown | 440 |
| Example 3-6 | | 1/0.4/5 | Yellow-brown | 460 |
| Example 3-7 | | 1/1/5 | Yellow-brown | 450 |
| Example 3-8 | | 1/2/5 | Dark yellow-brown | 450 |

Analysis and Tests

1. Using the Stabilizer SCD

Figure 2:
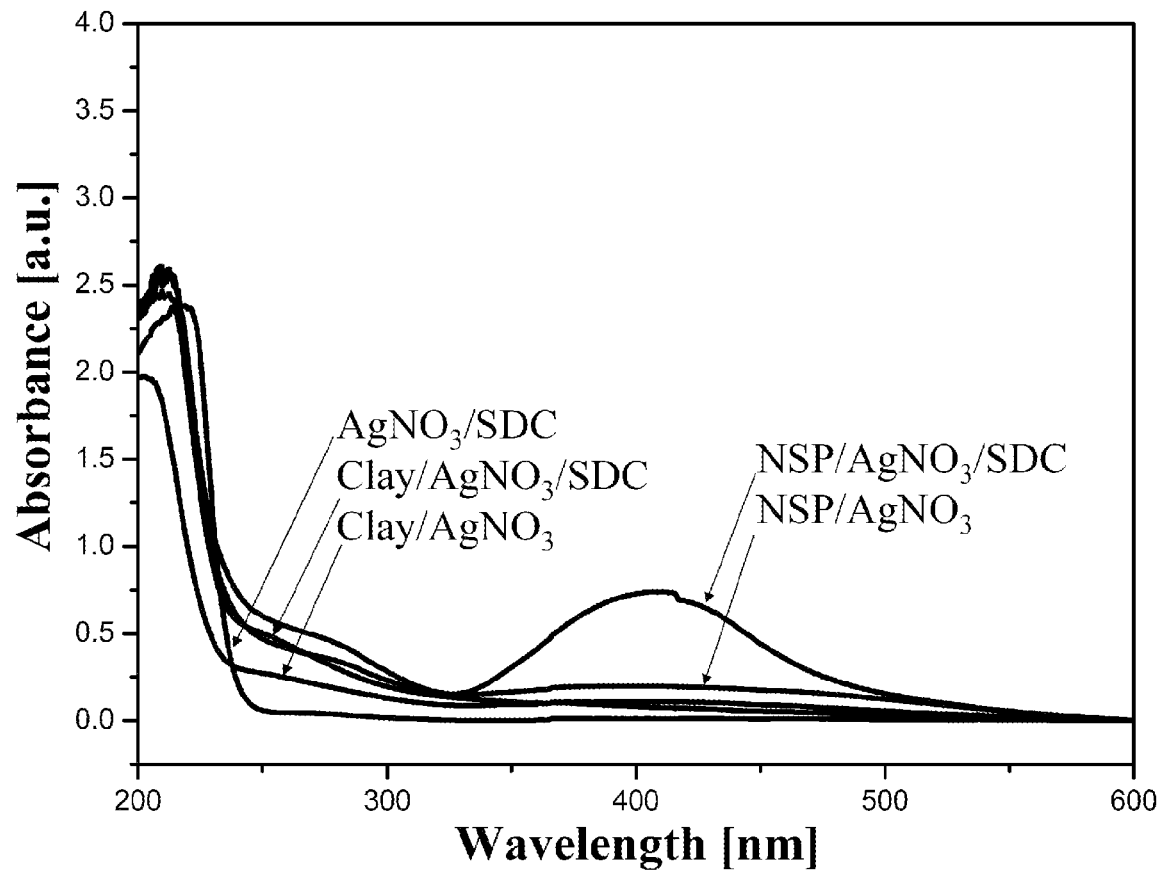
FIG. 2 shows UV adsorption spectrum of the Ag nanoparticles, nanosilicate platelets and clay (MMT)

FIG. 2 shows the UV spectrum of Ag nanoparticles of Example 1-4 and Comparative Examples 1-8~1-11, wherein the Ag nanoparticles of Examples 1-1 are transparent and yellow in the water solution. For Ag nanoparticles, the adsorption wavelength on UV is observed at 400 nm.

Figure 3A:
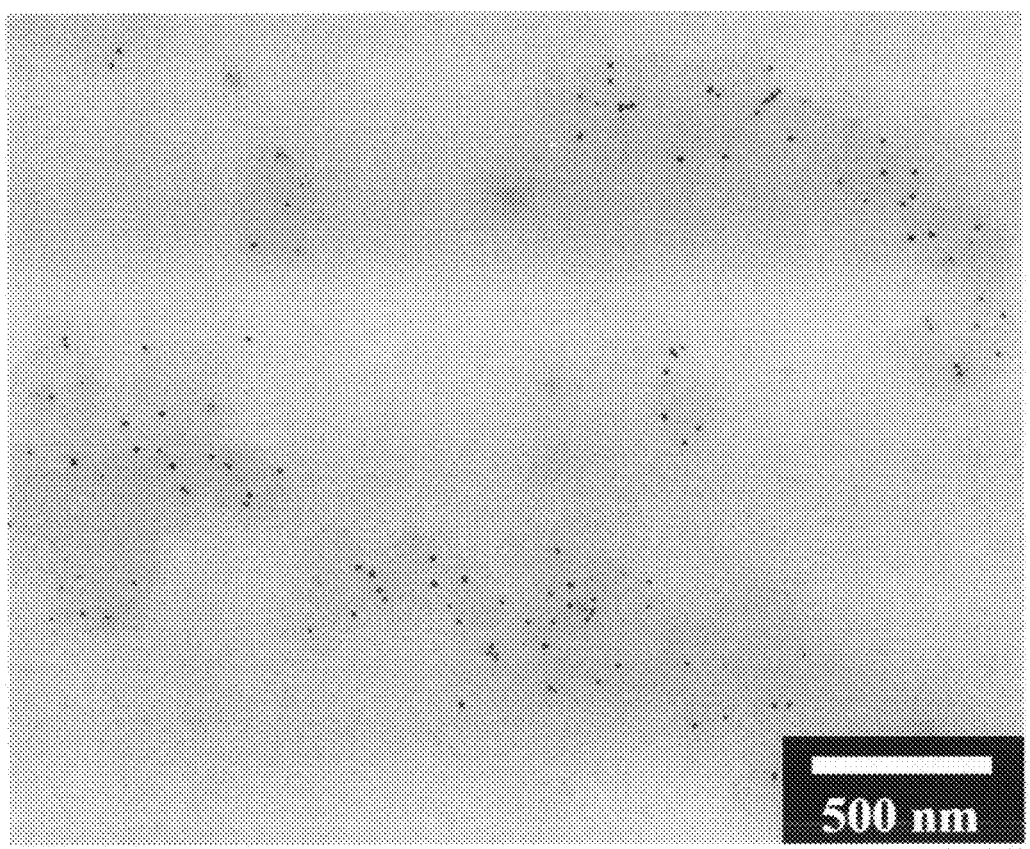
FIG. 3A and FIG. 3B show the TEM pictures of nanosilicate platelets adsorbed with Ag nanoparticles.
Figure 3B:
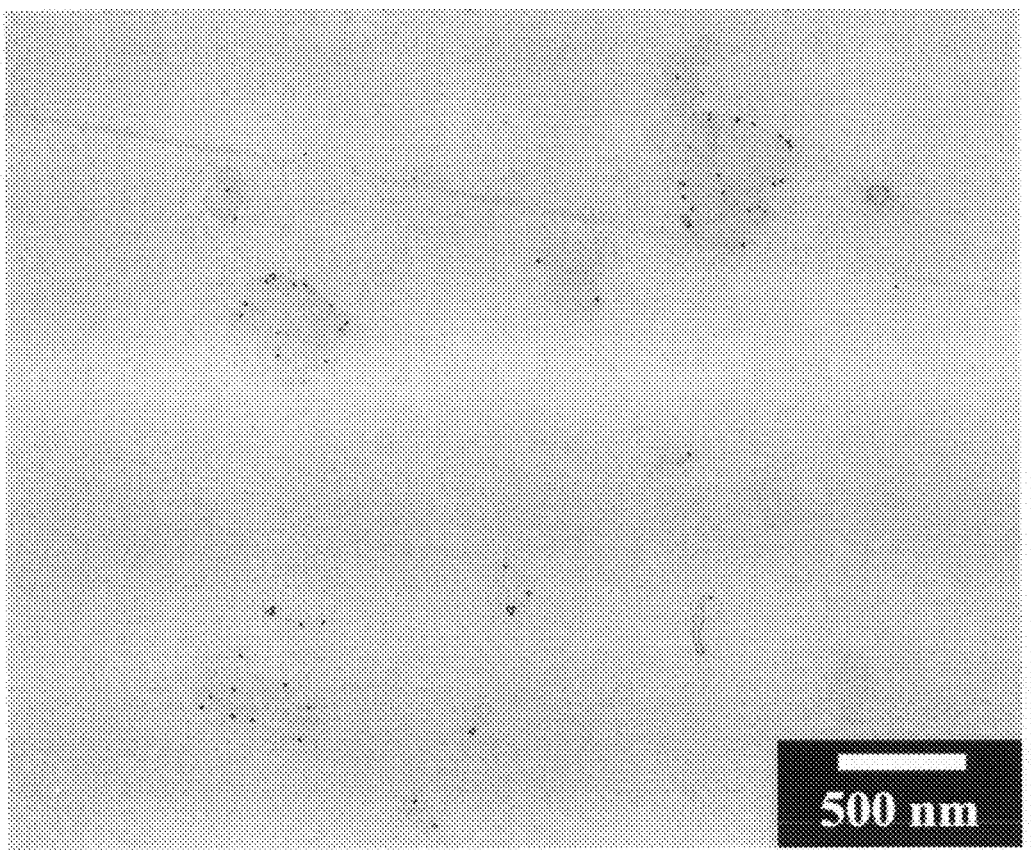

FIG. 3A and FIG. 3B show the TEM pictures of the Ag nanoparticles produced in Example 1-4, which are uniformly adsorbed on the nanosilicate platelets and have a diameter about 20 nm. This shows that the silver ions are first adsorbed on surfaces of the nanosilicate platelets, and then reduced to silver atoms through the redox reaction.

Figure 4:
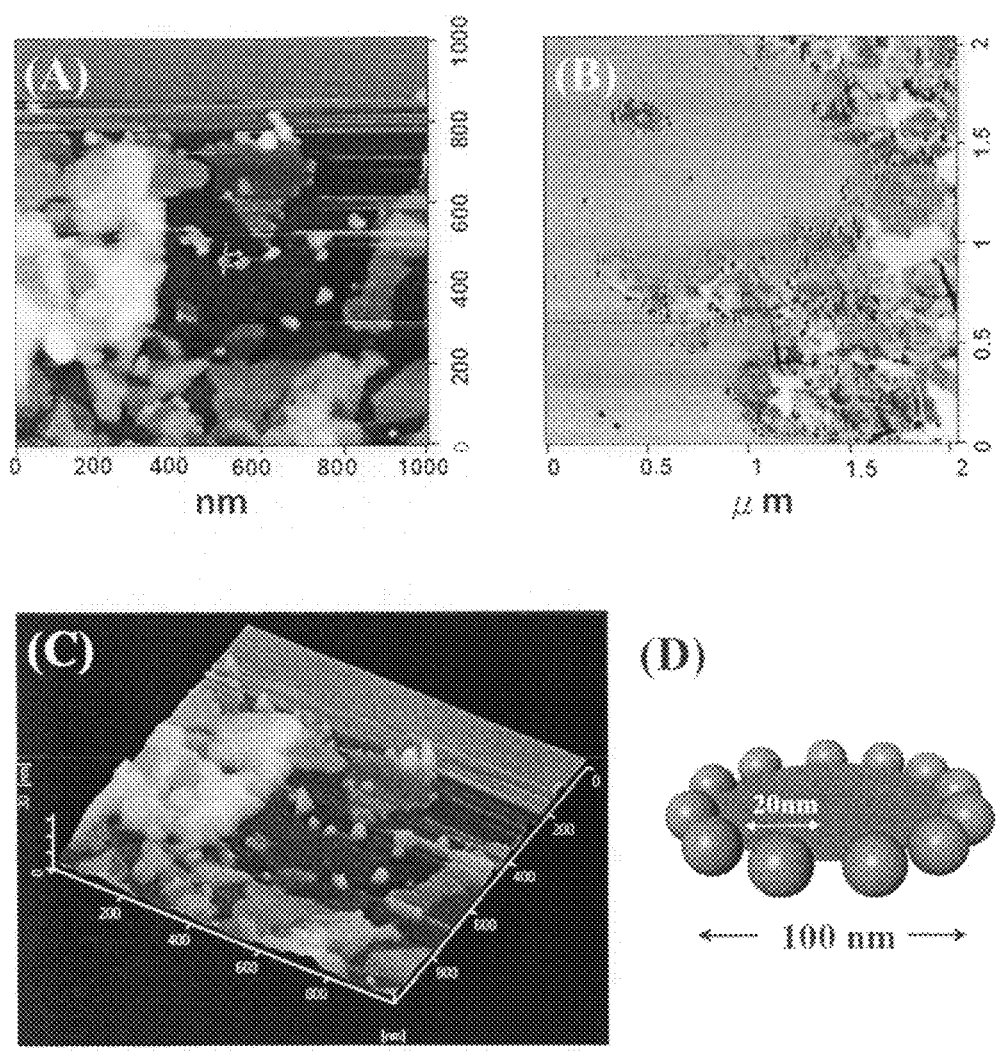
FIG. 4 shows the AFM pictures (a, b), 3D picture (c) and schematic view (d) of nano-disks.

FIG. 4 shows the AFM pictures of the Ag nanoparticles produced in Examples 1-4, which have a special disk-like structure. In FIG. 4, (a) and (b) are AFM pictures, (c) is a 3D view, and (d) is a schematic view. Apparently, the Ag nanoparticles are adsorbed around the nanosilicate platelets with a size about 20 nm. That is, the silver ions can be effectively reduced by the nanosilicate platelets having high charge density and the reduced nanoparticles can be fixed or uniformly dispersed around the nanosilicate platelets without aggregation.

Figure 5:
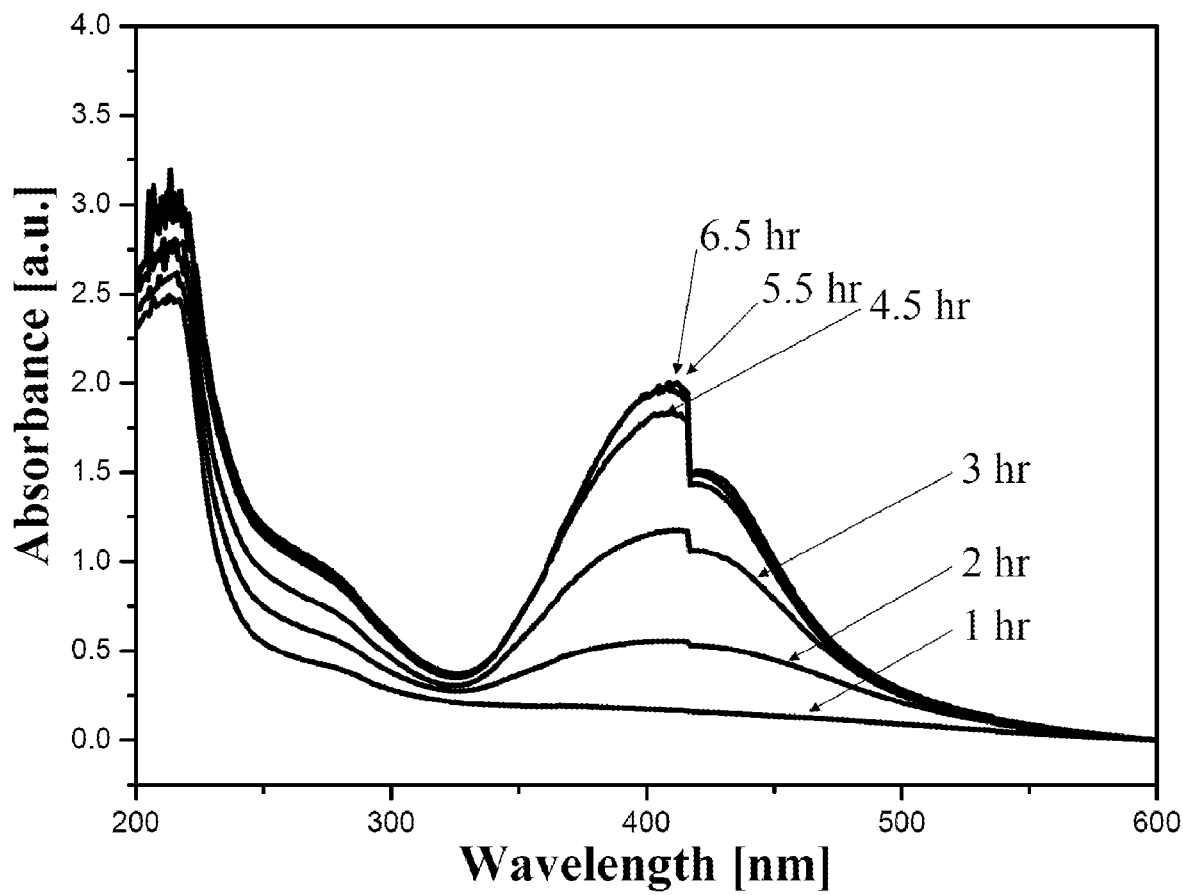
FIG. 5 shows UV adsorption spectrum of the Ag nanoparticles sampled with time.

FIG. 5 shows UV adsorption spectrum of the Ag nanoparticles of Example 1-1 (NSP=0.1 wt. %, weight ratio of NSP/AgNO$_3$=1/0.2), which are sampled a different times. With increasing reaction time, silver ions are continuously reduced until 6 hours.

Figure 6:
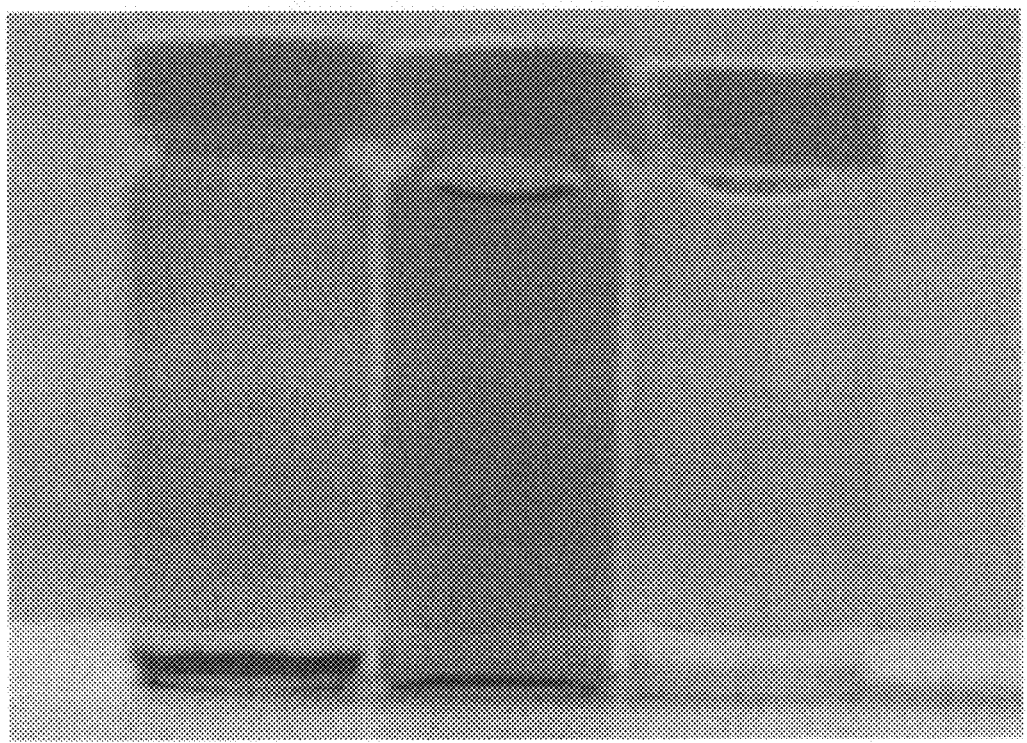
FIG. 6 shows the solutions of silver ions reduced with NSP (0.1 wt. %)

FIG. 6 shows the solutions of silver ions reduced with NSP (0.1 wt. %). In FIG. 6, (a) and (b) are the solutions of Examples 1-1 and 1-2 (weight ratio of NSP/AgNO$_3$=1/0.2 and 1/2), in which the silver ions are successfully reduced; but (c) is the solution of Comparative Example 1-1 (weight ratio of NSP/AgNO$_3$=1/10), in which the silver ions is not reduced. The reason is that NSP is a weak reducer and hardly effective in a low concentration.

Figure 7:
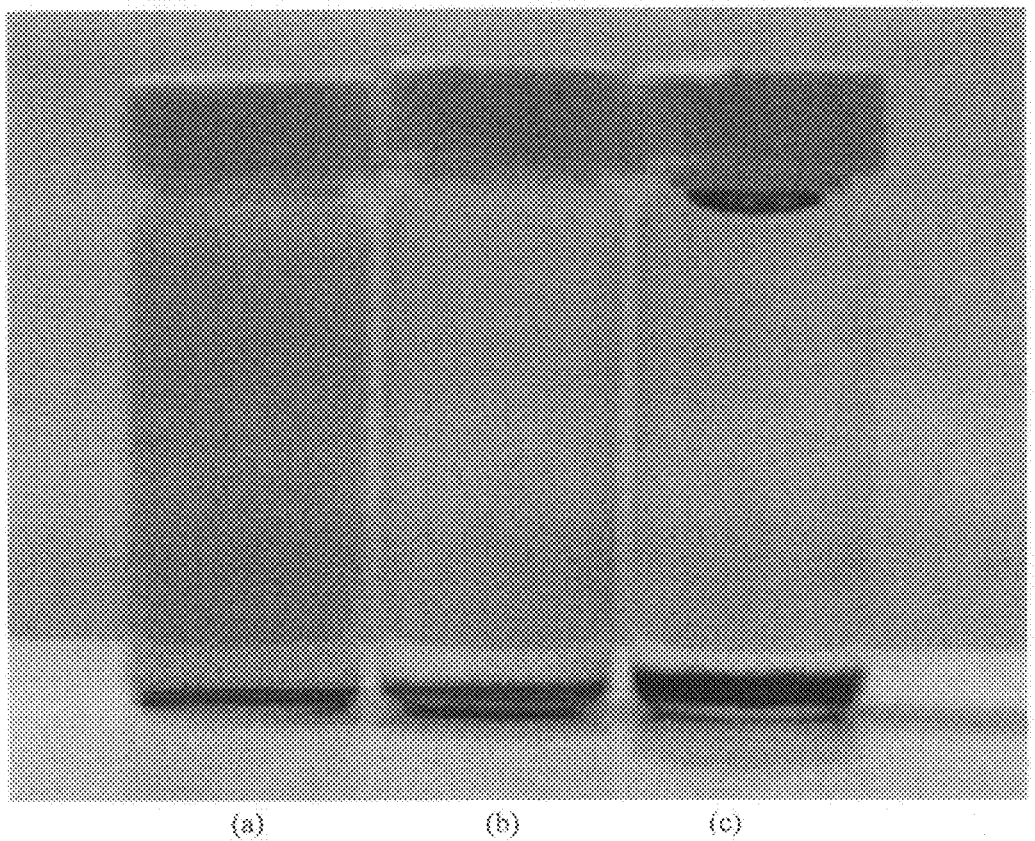
FIG. 7 shows the solutions of silver ions reduced with NSP (0.5 wt. %)

FIG. 7 shows the solutions of silver ions reduced with NSP (0.5 wt. %). In FIG. 7, (a) is the solution of Example 1-4 (weight ratio of NSP/AgNO$_3$=1/0.2), in which the silver ions are successfully reduced; but (b) and (c) are the solutions of Comparative Examples 1-2 and 1-3 (weight ratio of NSP/AgNO$_3$=1/2 and 1/10), in which the reduced silver particles precipitate because concentrations of the silver ions are too high.

2. Using the Stabilizer Chitosan

Figure 8:
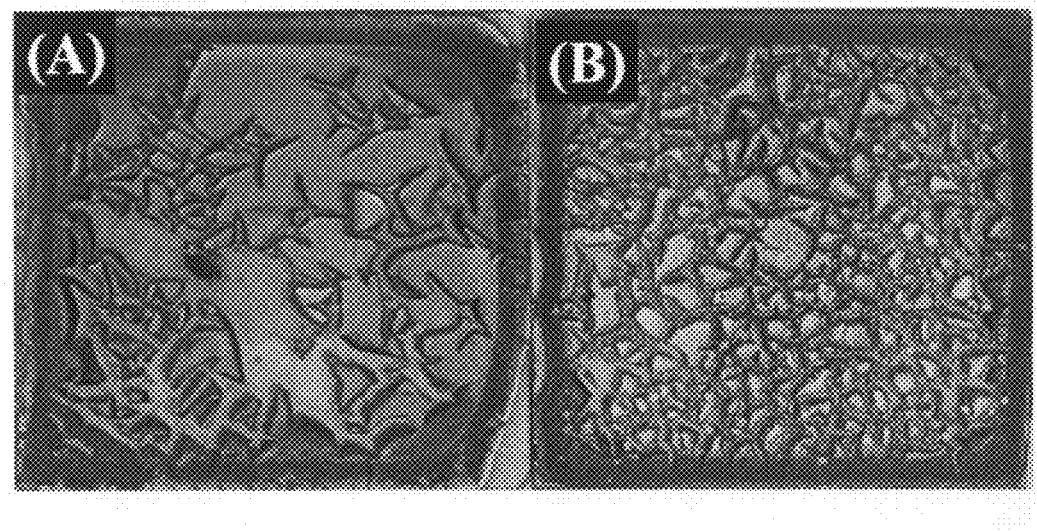
FIG. 8 shows the sintered Ag nanoparticles.
Figure 9:
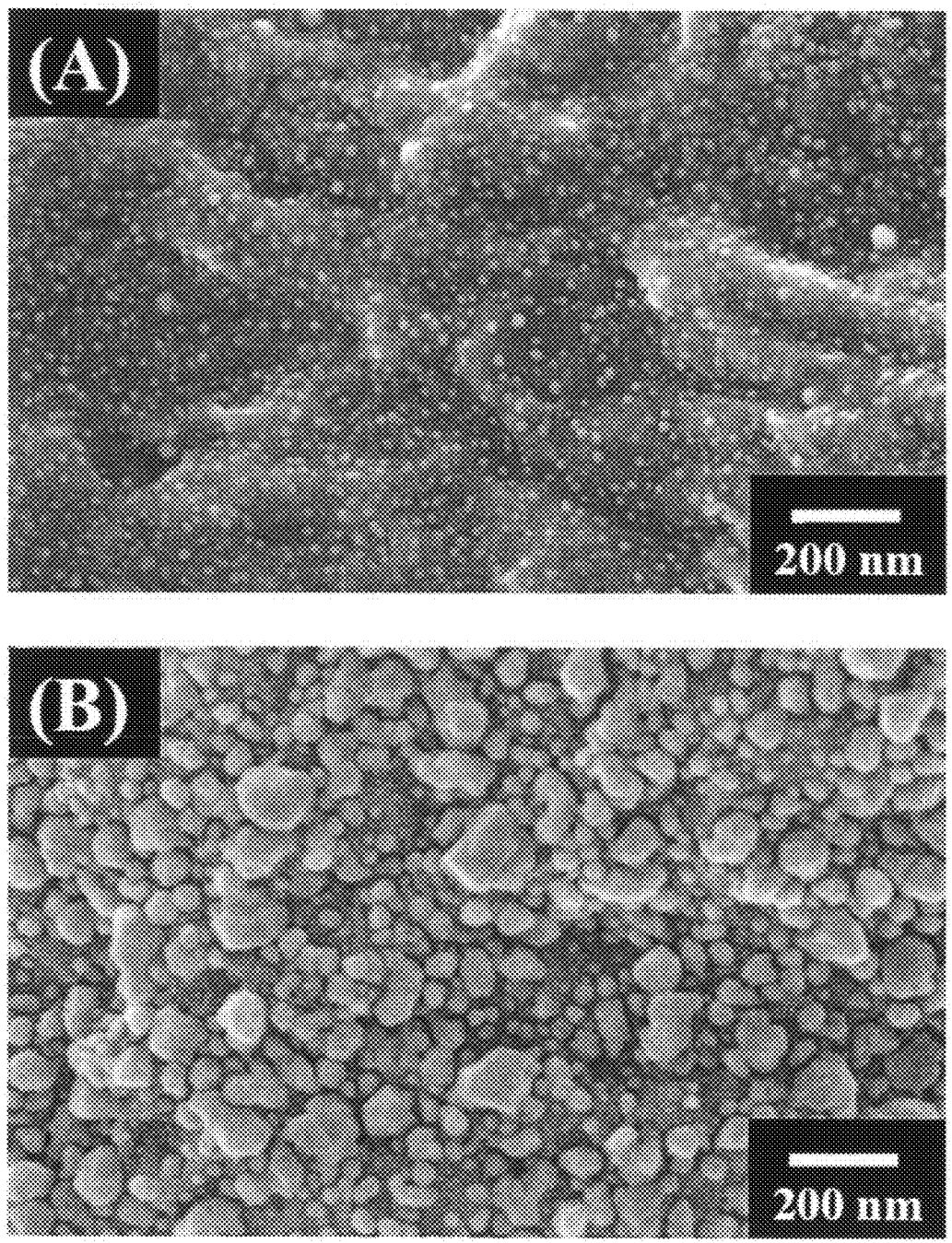
FIG. 9 shows the FE-SEM pictures of sintered Ag nanoparticles.

FIG. 8 shows the Ag nanoparticles of Example 2-9 which is sintered at 100° C. and 150° C., and FIG. 9 shows the FE-SEM pictures thereof. In FIG. 9, (a) shows the silver atoms with an average diameter about 20 nm when sintered at 100° C.; and (b) shows the silver atoms melt as larger particles at 150° C. The Ag nanoparticles have special surface characteristics and thermal properties different from the larger particles, for example, a lower sintering temperature. Such result further implies that silver wires made from the Ag nanoparticles of the present invention will have lower electric resistance.

As the reaction of the present invention can be performed with materials of higher concentrations, a smaller-scale plant will be enough, or more production can be achieved when operated in the same conditions. Certainly, a highly-concentrated solution of Ag nanoparticles can be prepared.

3. Using the Stabilizer PVP

Figure 10:
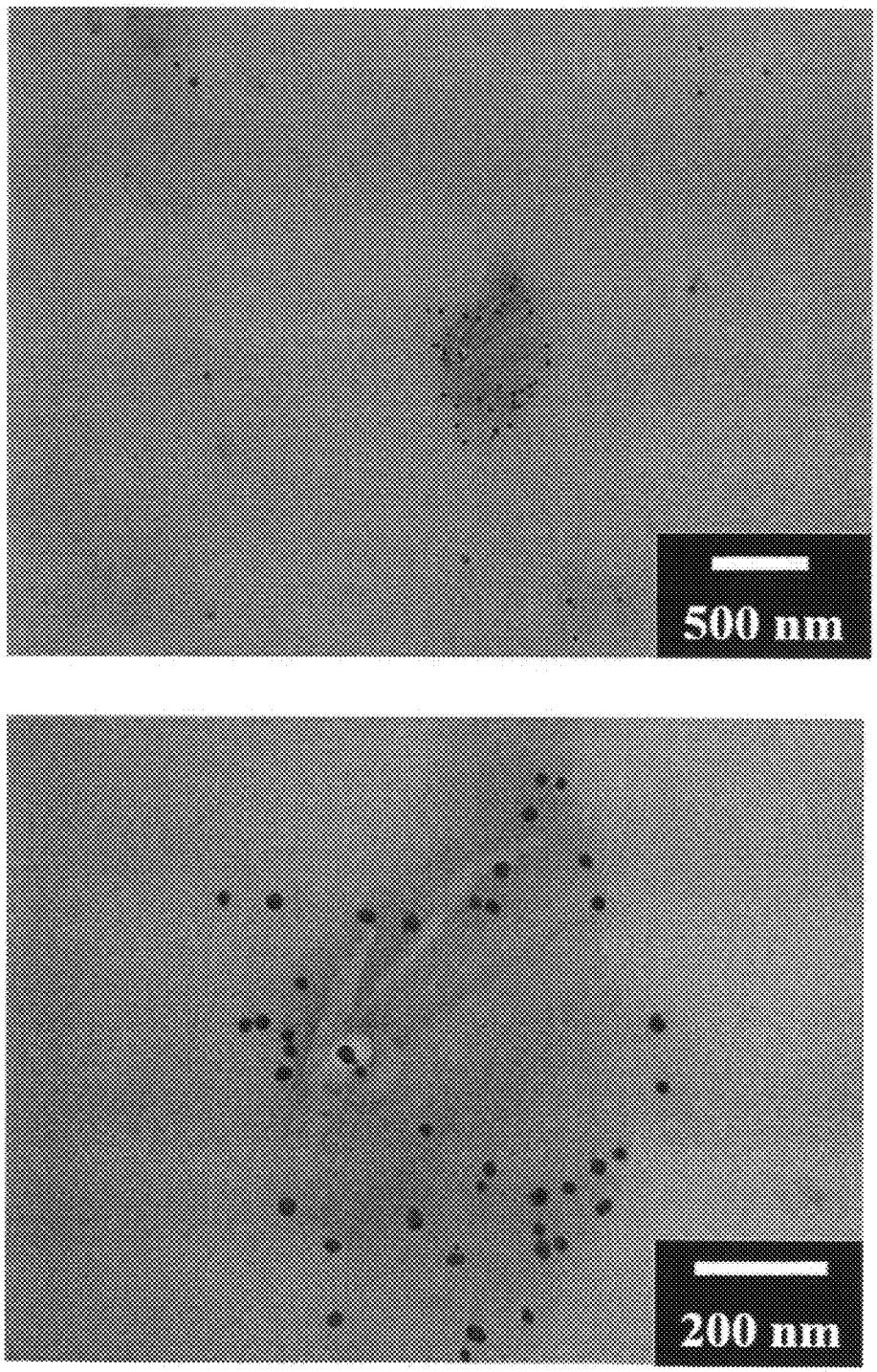
FIG. 10 shows the TEM pictures of nanosilicate platelets and Ag nanoparticles.
Figure 11:
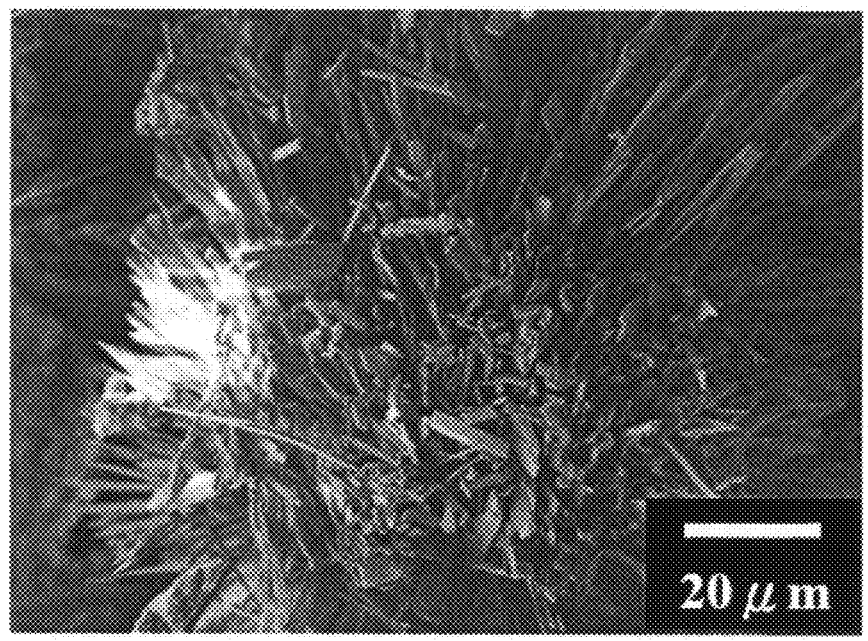
FIG. 11 shows crystals of the dried product (NSP/AgNO$_3$/PVP=10/1/1).
Figure 11:
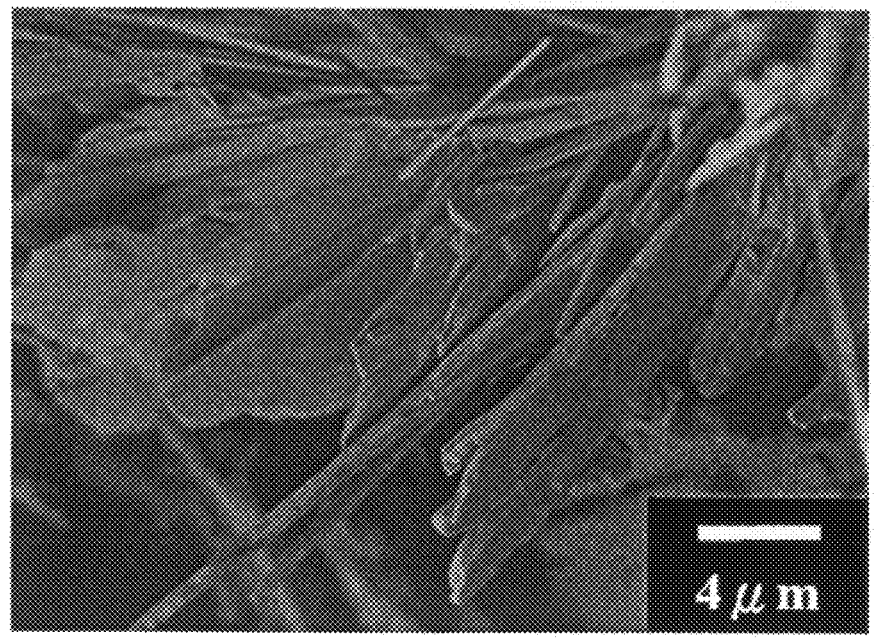

FIG. 10 shows the TEM pictures of nanosilicate platelets and Ag nanoparticles of Examples 3-1~3-8, in which the Ag nanoparticles have a small size less than 20 nm and can be dried as a thin film. The product (weight ratio of NSP/AgNO$_3$/PVP=10/1/1) is first dried at 100° C. then left alone, and after one day, rod-like crystals can be observed, as shown in FIG. 11. As the silicate platelets have particular characteristics in crystallization and adsorbing the Ag nanoparticles, crystals thereof are more apparent. That is, new rod-like materials can be developed from the Ag nanoparticles.

In the present invention, the nanosilicate platelets (NSP) are used to reduce silver ions instead of traditional reducers. By strong adsorption to the NSP, the Ag nanoparticles can not attract to each other and are dispersed in a nano-scale. The dispersion of Ag nanoparticles is stable enough and can be transferred to an organic solvent, and therefore applications thereof will be wide. Moreover, the Ag nanoparticles will exhibit better antimicrobial, sterilizing, and catalytic abilities, and are suitable for fields of biology, medicine, material, chemistry, etc.

What is claimed is:

1. A method for reducing metal ions with nanosilicate platelets (NSP), comprising: mixing tri-sodium citrate dihydrate (SCD) with a water solution of AgNO$_3$, and then with the NSP to perform a reductive reaction to yield a solution of stably dispersed silver nanoparticles; wherein the nanosilicate platelets have a specific surface area ranging from 700 m$^2$/g to 800 m$^2$/g, surface charges 20,000 ions/platelet, 4×10$^{16}$ platelets/gram and an isoelectric point (IEP) pH 6.4, the NSP is first dissolved in water to have a concentration of 0.01~0.1 wt.%, the weight ratio of NSP/AgNO$_3$ is 1/0.2~1/4, and the equivalent ratio of NSP/SCD is 1/1.1~1/21.5.

2. The method as claimed in claim 1, wherein the nanosilicate platelets are exfoliated smectic silicate clay.

3. The method as claimed in claim 2, wherein the smectic silicate clay is selected from the group consisting of synthetic fluoric mica, Na-MMT, kaolin, synthetic layered double hydroxide (LDH), talc, attapulgite clay and vermiculite.

4. A method for reducing metal ions with nanosilicate platelets (NSP), comprising: mixing tri-sodium citrate dihydrate (SCD) with a water solution of AgNO$_3$, and then with the NSP to perform a reductive reaction to yield a solution of stably dispersed metal silver nanoparticles; wherein the nanosilicate platelets have a specific surface area ranging from 700 m$^2$/g to 800 m$^2$/g, surface charges 20,000 ions/platelet, 4+10$^{16}$ platelets/gram and an isoelectric point (IEP) pH 6.4, the NSP is first dissolved in water to have a concentration of about 0.01~1.0 wt.%, the weight ratio of NSP/AgNO$_3$ is 1/0.2~1/1, and the equivalent ratio of NSP/SCD is 1/1.1~1/10.

5. The method as claimed in claim 1, wherein the reductive reaction is performed at 60° C.

6. The method as claimed in claim 1, wherein the reductive reaction is performed for 1~4 hours.

7. The method as claimed in claim 1, wherein the silver nanoparticles have a diameter 20 nm 8. The method as claimed in claim 4, wherein the nanosilicate platelets are exfoliated smectic silicate clay.

9. The method as claimed in claim 4, wherein the smectic silicate clay is selected from the group consisting of synthetic fluoric mica, Na$^+$-MMT, kaolin, synthetic layered double hydroxide (LDH), talc, attapulgite clay and vermiculite.

\* \* \* \* \*